H. S. DICKINSON & J. R. TYLER.
LANTERN.
APPLICATION FILED AUG. 12, 1908.

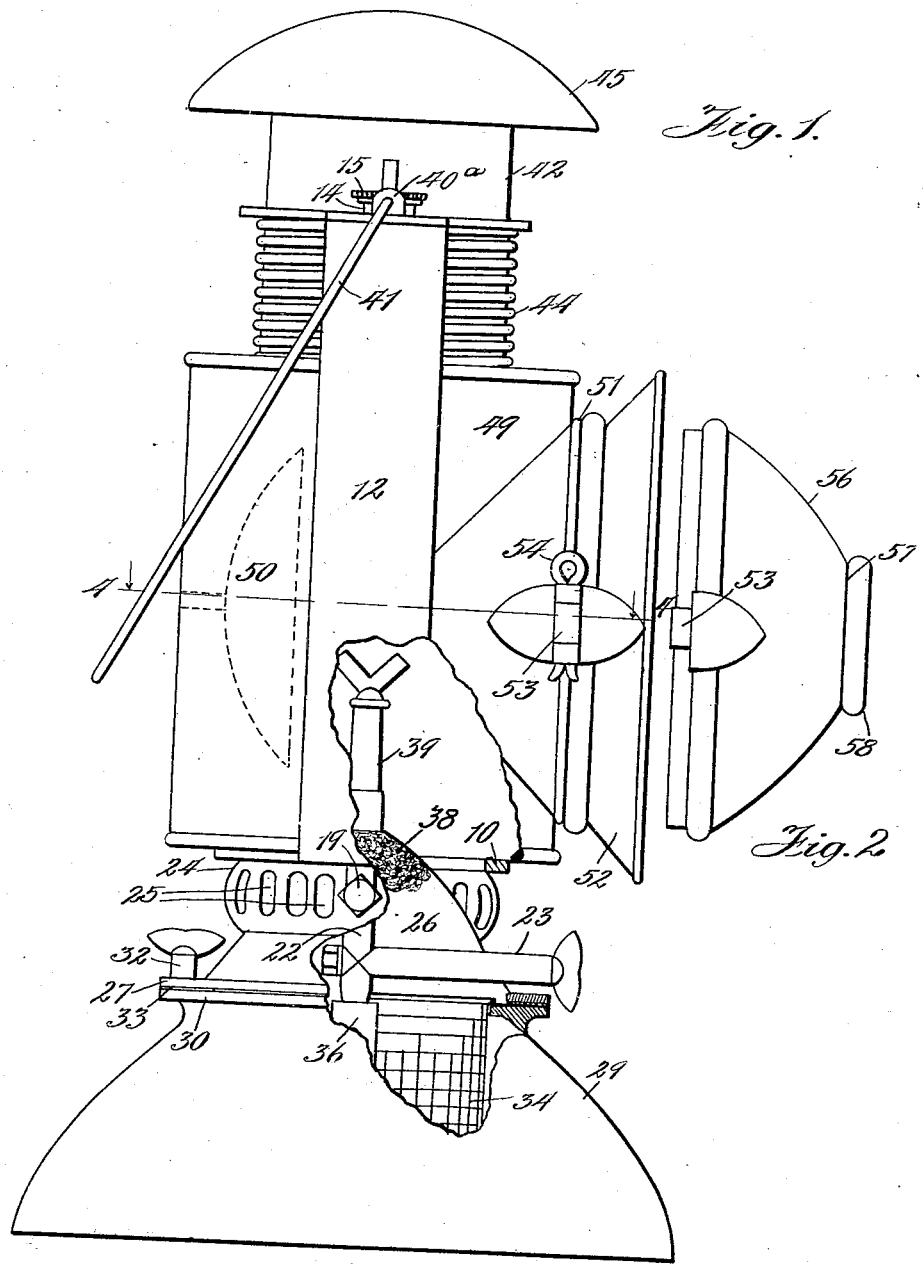

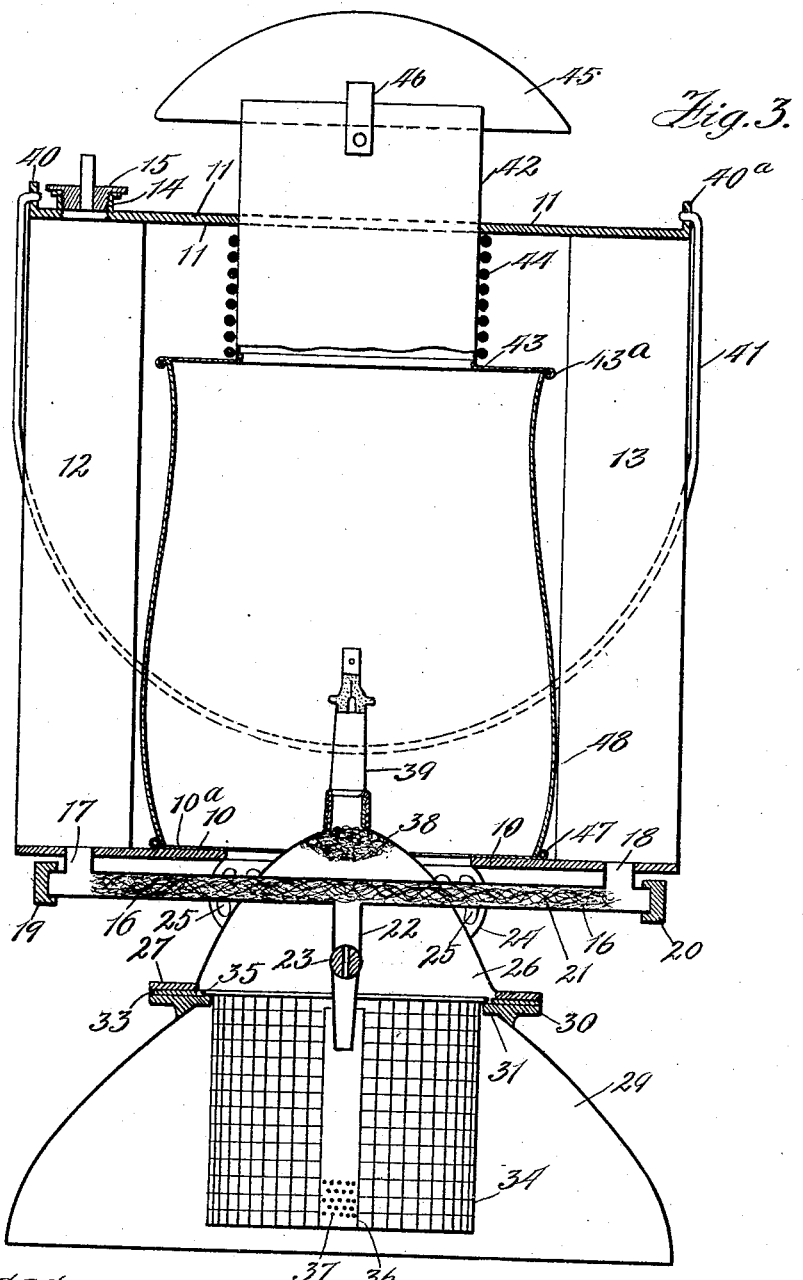

918,131.

Patented Apr. 13, 1909.
3 SHEETS—SHEET 3.

Witnesses:

Inventors:
Harry S. Dickinson
John R. Tyler
By Luther L. Miller, Atty.

UNITED STATES PATENT OFFICE.

HARRY S. DICKINSON, OF MOLINE, AND JOHN R. TYLER, OF CHICAGO, ILLINOIS.

LANTERN.

No. 918,131.  Specification of Letters Patent.  Patented April 13, 1909.

Application filed August 12, 1908. Serial No. 448,114.

*To all whom it may concern:*

Be it known that we, HARRY S. DICKINSON and JOHN R. TYLER, citizens of the United States, residing at Moline, in the county of Rock Island, and at Chicago, in the county of Cook, respectively, in the State of Illinois, have invented certain new and useful Improvements in Lanterns, of which the following is a specification.

This invention relates to lanterns and one of the objects thereof is to provide a lantern which may be easily operated.

Another object is to provide a lantern which may be equipped with an acetylene burner in such a manner that the lantern body will not become heated when the burner is lighted.

Another object is to provide means which may be utilized for search-light purposes, or for general use, or for candling or inspecting eggs.

Other objects and advantages of the invention will be apparent from the following description taken in connection with the drawings, in which—

Figure 4:
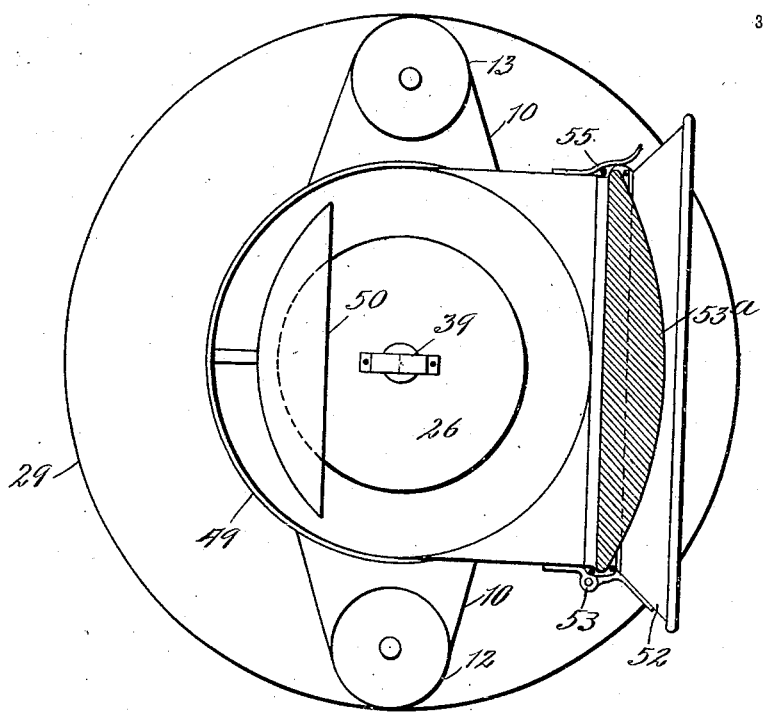
Figure 5:
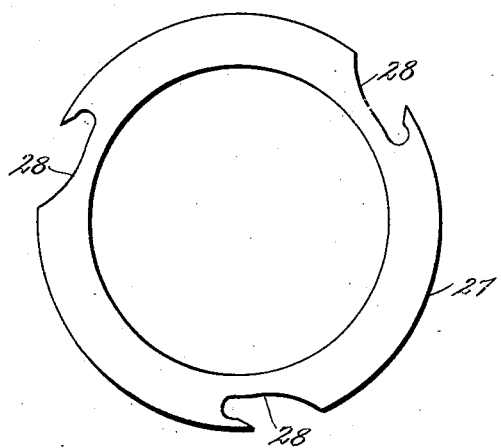

Figure 1 is an elevational view of one form of our lantern equipped for search-light purposes, parts being broken away to show the interior construction thereof. Fig. 2 is an interchangeable door to be used with the general form shown in Fig. 1 to provide for egg candling. Fig. 3 is a vertical longitudinal sectional view through a modified form of lantern, an ordinary chimney being substituted for the hood shown in Fig. 1. Fig. 4 is a sectional view on the line 4 4 of Fig. 1. Fig. 5 is a plan view of the base supporting ring carried by the gas font or dome.

Referring now to the drawings by numerals of reference, 10 designates a base plate and 11 a top plate. Interposed between said plates 10 and 11 and spaced a suitable distance apart are liquid fonts 12 and 13. The font 12 is provided with a flanged opening 14 having a tubular plug 15 therein, by means of which a suitable liquid, preferably water, may be introduced into the font. The fonts 12 and 13 are connected by the tube 16 in communication with the bottoms of said fonts by the tubular branches 17 and 18, whereby liquid from the font 12 may pass through said tube 16 and enter the font 13; if desired, however, both fonts may be provided with openings similar to the one designated 14 provided for the font 12. The ends of the tube 16 have detachable closures comprising caps 19 and 20, whereby a suitable wick 21 may be inserted in said tube 16 to permit the passage of the liquid from the tube 16 into the feed nozzle 22 and onto the carbid. The nozzle 22 is provided with a turning plug 23 which may be turned to regulate the flow of liquid from the nozzle into the carbid chamber.

Depending from the base plate 10 is an annulus 24 in which is formed a plurality of openings 25 arranged in circular series to provide vents for the burner. This annulus 24 supports a gas dome or gas font 26 which is also supported by the tube 16. The bottom of the font 26 is open and at its lower edge is an outstanding annular flange 27, the specific form of which is illustrated in plan in Fig. 5. The flange 27 is provided with a plurality of cam notches 28.

29 designates a carbid chamber having an outstanding flange 30 at its open end and an inwardly projecting flange 31 adjacent to the flange 30. The flange 30 receives a plurality of thumb screws 32 adapted to be engaged by the notches 28 of the flange 27 so that by screwing said screws 32 into the flange 30, the flange 27 will support the carbid receptacle 29. When it is desired to detach the receptacle 29 it is only necessary to loosen the screws 32 and impart a slight rotary motion to the receptacle 29 to move the shanks of the screws 32 out of engagement with the notches. In order to prevent leakage, a gasket or packing ring 33 is provided to lie between the flanges 27 and 30. Within the receptacle 29 is a basket 34 of reticulated form. This basket 34 has a bead 35 resting upon the flange 31. The basket 34 is provided to receive the carbid and it has a central, vertical tube 36, the lower portion of which is perforated as at 37, and the upper portion of which is imperforate. The tube 36 surrounds the discharge end of the nozzle 22 so that water dropped from said nozzle will be distributed into the basket 34 near the bottom thereof to liberate gas into the dome or font 26. The dome 26 is provided with a filling of suitable filtering material 38, held in place by the tube 16, and, at the top of the dome, is an acetylene burner 39 of preferred construction.

The top plate 11 is provided with upstanding ears 40 and 40ª to receive a bail 41. This plate 11 also carries a ventilating flue 42 slidable in said plate and having a flange 43 with a peripheral bead 43ª and against which one end of a spring 44 rests, the other end of said spring resting against the underside of the plate 11. The flue 42 carries a cowl 45 spaced from the top thereof by the straps 46. The bottom plate 10 may support a removable plate 10ª having a central opening (Fig. 3) and provided with a bead 47 to receive the lower edge of a glass chimney 48, and said chimney is held against displacement by the spring-pressed ventilating flue 42. In the event that a hood is substituted for the chimney 48, we may dispense with the plate 10ª. In Fig. 1, we have shown a hood in lieu of the glass chimney 48 shown in Fig. 3. This hood is designated by the numeral 49 and it consists of a tubular body portion having a reflector 50 carried by the interior thereof and an opening 51 provided with a door 52 hinged at 53, the barrels of the hinged section being preferably connected by cotter pins 54 whereby said door 52 may be removed, and another door substituted therefor. The door 52 is provided with a lens 53ª common to such devices and the door 52 may be secured by a spring latch 55 (see Fig. 4). The door 52 is employed, when the lantern is to be used as a search-light, but when it is desired to candle eggs, the extension or door 56 (Fig. 2) may be substituted, said extension or door 56 having a hinge portion 53 corresponding to the hinge 53, Fig. 1. In the door 56 is an opening 57 having an insulating ring 58. Except for the difference noted, the lantern shown in Fig. 1 and that shown in Fig. 3 are identical.

From the foregoing it will be apparent that when carbid is placed in the basket 34 and the turning plug 23 is turned to permit water to drop into the tube 36, gas will be generated and pass up into the dome 26, from which it may be ignited from the burner 39. The gas generator may be regulated by the turning plug 23 because, as is well known, the volume of gas generated in a given time will be regulated by the amount of water issuing from the nozzle 22.

The glass chimney 48 and the hood 49 each constitute what may be termed a housing for the burner.

We would have it understood that we desire not to be limited to the details of construction herein shown and described, for various modifications will occur to persons skilled in the art.

We claim as our invention:

1. A lantern comprising a body portion provided with a gas dome and a burner in communication therewith; a notched flange carried by said gas dome; a carbid receptacle; and means carried thereby for engagement with the notched flange on the gas dome.

2. A lantern comprising a base plate; a plurality of liquid receptacles on said base plate; a tube in communication with said receptacles; a valve outlet port in communication with the tube; a carbid receptacle with which said port communicates; a burner in communication with said carbid receptacle; means on the base for surrounding the burner; and spring pressed means for holding said first named means on the base.

3. In a lantern, in combination, a supporting structure comprising a base plate, a top plate and two liquid receptacles extending between and secured to said plates; a carbid receptacle operatively connected with said base plate and communicating with said liquid receptacles; a burner operatively connected with said carbid receptacle; a hood adapted to be seated upon said base plate between said liquid receptacles; a ventilating flue slidable in said top plate and adapted to bear upon said hood; a spring bearing at one end against said top plate and acting at its other end upon said ventilating flue for holding said hood seated upon said base plate, said hood having an opening in one side; an extension adapted to fit over said opening and being connected with said hood, said extension having an opening therein; and an insulating ring for the last mentioned opening.

4. In a lantern, in combination, a supporting structure comprising a base plate, a top plate and two liquid receptacles extending between and secured to said plates; a carbid receptacle operatively connected with said structure and communicating with said liquid receptacles; a burner operatively connected with said carbid receptacle; and a burner housing removably seated in said structure between said liquid receptacles.

5. In a lantern, in combination, a supporting structure comprising two liquid receptacles in the form of tubes located at opposite sides of said structure; a carbid receptacle operatively connected with said structure and communicating with said liquid receptacles; and a burner operatively connected with said carbid receptacle.

6. In a lantern, in combination, a supporting structure comprising two liquid receptacles in the form of tubes located at opposite sides of said structure; a gas dome attached to the lower end of said structure; a pipe extending from one of said receptacles to the other through said gas dome; a carbid receptacle connected with the lower end of said gas dome; a valved outlet from said pipe to said carbid receptacle; and a burner operatively connected with said gas dome.

7. In a lantern, in combination, a structure comprising a base plate and two liquid receptacles located at opposite ends of said base plate, said plate having a central opening therein; a gas dome; means for connecting said gas dome with said base plate; a burner operatively connected with said gas dome, said connecting means permitting the entrance of air through said central opening to said burner; and a carbid receptacle operatively connected with said gas dome and communicating with said liquid receptacles.

HARRY S. DICKINSON.
JOHN R. TYLER.

Witnesses to the signature of Harry S. Dickinson:
J. B. McKINLEY,
DEAN FRANKLIN.

Witnesses to the signature of John R. Tyler:
GEORGE L. CHINDAHL,
LUTHER L. MILLER.